Jan. 21, 1964 D. SCARAMUCCI 3,118,465
DISC VALVE
Filed Feb. 18, 1963 5 Sheets-Sheet 1

INVENTOR.
DOMER SCARAMUCCI
BY
*Jerry J Dunlap*
ATTORNEY

INVENTOR.
DOMER SCARAMUCCI

Jan. 21, 1964     D. SCARAMUCCI     3,118,465
DISC VALVE

Filed Feb. 18, 1963     5 Sheets-Sheet 3

INVENTOR.
DOMER SCARAMUCCI
BY
ATTORNEY

INVENTOR.
DOMER SCARAMUCCI
BY
ATTORNEY

United States Patent Office 3,118,465
Patented Jan. 21, 1964

3,118,465
DISC VALVE
Domer Scaramucci, Box 9125, Oklahoma City 15, Okla.
Filed Feb. 18, 1963, Ser. No. 261,934
17 Claims. (Cl. 137—454.2)

This invention relates generally to improvements in valves, and more particularly, to improvements in valves of the type commonly known as disc or butterfly valves.

This is a continuation-in-part of applicant's co-pending application Serial No. 851,900, filed November 9, 1959, now abandoned, and entitled "Disc Valve."

The disc valve has been known and is well accepted in industry. Compared to other types of valves, the disc valve has several advantages. One of the primary advantages is that very low torque is required to open and close the valve, due to the fact that fluid pressures and fluid flow forces are balanced on the disc of the valve at any point during its opening and closing. The disc valve provides excellent flow characteristics—providing relatively low energy losses as fluid flows through the valve. Also, it is readily adapted to the handling of slurries, colloidal suspensions and semi-solids as are often encountered in the chemical and petroleum industries. The disc valve is compact, relatively inexpensive to manufacture, and has fewer working parts than most other types of valves.

Certain disadvantages, however, in existing disc-type valves have limited the use of such valves and have curtailed the more widespread application of the valve in various industries. Disc-type valves are characterized by having a substantially circular-shaped disc member rotatably supported in a tubular body on an axis extending transversely across the center of the passageway through the body, such that the disc opens and closes the passageway through the body when the disc is turned. Many prior disc-type valves have utilized an annular seat formed of an elastic material and secured around the inner periphery of the valve body for contact with the valve disc in the closed position of the disc, which provides a seal around the disc and effectively prevents leakage around the disc. Heretofore, however, such valve seats have been secured to the valve body in such a manner as to be difficult to replace. Prior disc-type valves have also utilized tubular fittings at each end of the valve body to facilitate the disassembly of the valve while the valve is interposed in a conduit, but considerable difficulty has been experienced in providing a seal between the tubular fittings and the valve body by an economical construction, particularly when the valve is used in vacuum service.

The valve disc of most present day valves is ordinarily secured on a shaft extending through and journaled in the valve body, such that a handle may be provided on the shaft to turn the valve disc between its opened and closed positions. Heretofore, it has been common practice to secure the valve disc on the shaft by screw-type fasteners which provide obstructions in the flow path of fluid passing through the valve when the valve is in an open position; which frequently are sheared off when substantial resistance is encountered in opening or closing the valve disc, and which require substantial complicated machining operations for properly centering the valve disc in the valve body. Also, when the valve disc is attached to the shaft by screws or the like, the valve disc is subjected to any inadvertent sideways or lengthwise movement of the supporting shaft, which movements ordinarily occur each time the valve is opened or closed.

The present invention contemplates a novel disc valve construction utilizing a metal liner around the inner periphery of the valve body for supporting an annular valve seat in the proper position for engagement by the valve disc. The metal liner is of a size to provide a sliding fit thereof in the valve body, such that the valve seat is easily removed and replaced, without the use of any special tools or any particular effort. In the preferred construction, the valve seat is bonded to the metal liner and it is provided with circumferential flanges at its opposite ends which cooperate with tubular fittings at each end of the valve body to effectively seal the valve when the valve is used in either pressure or vacuum service. The present invention also contemplates a novel connection of the valve disc on its supporting shaft by utilizing cooperating flat surfaces on the shaft and in the opening through the valve disc in such a manner that the valve disc may be self-centered in the valve seat and will not be affected by inadvertent lengthwise or sidewise movements of the supporting shaft.

The present invention further contemplates a novel method of forming the disc of a disc-type valve wherein flat surfaces are provided in the shaft opening through the disc to cooperate with flat surfaces on a supporting shaft for the disc by use of a minimum of machine operations and in such a manner that the maximum strength will be provided in the connection of the valve disc to the supporting shaft, without increasing the size of the valve disc or providing obstructions to the flow of fluid through the valve in which the disc is utilized.

An important object of this invention is to provide a disc valve which may be easily repaired in the field and without the use of special tools.

Another object of this invention is to provide a disc valve utilizing an elastic seat, wherein the seat may be replaced in a minimum of time and with a minimum of effort.

A further object of this invention is to attach a valve disc to its supporting shaft in a disc-type valve in such a manner that the valve disc will not be affected by inadvertent movements of the supporting shaft and wherein the valve disc will be self-centering in a cooperating seat in the valve. Also, the valve disc may be easily removed from its supporting shaft when the valve is disassembled.

Another object of this invention is to provide a disc-type valve having the minimum obstructions to the flow of fluids through the valve.

A further object of this invention is to eliminate the necessity of secondary seals around the shaft in a disc-type valve to prevent leakage around the shaft. It is also an object of this invention to eliminate the necessity for screw-type fasteners for securing a valve disc to its supporting shaft in a disc-type valve.

An additional object of this invention is to provide an efficient and economical method of forming a valve disc for a disc-type valve.

A still further object of this invention is to provide a disc valve which is simple in construction, may be economically manufactured and which will have a long service life.

Other objects and advantages of the invention will be evident from the following detailed description, when read in conjunction with the accompanying drawings which illustrate my invention.

Figure 1:
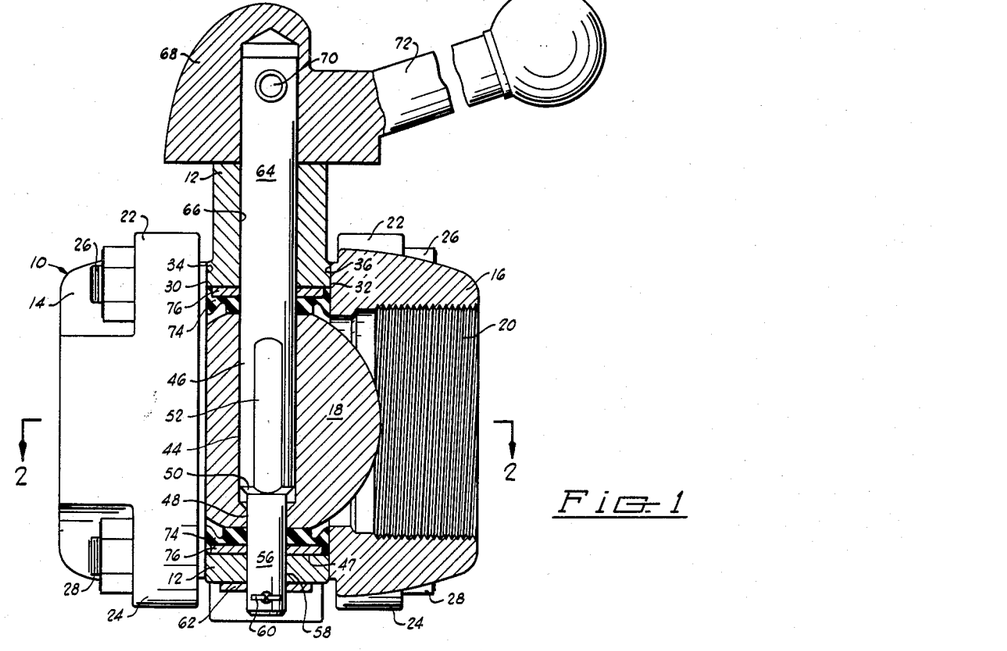
FIG. 1 is a vertical sectional view taken along the longitudinal centerline of a disc valve constructed in accordance with this invention, but with one end portion of the valve shown in elevation.

Referring to the drawings in detail, and particularly FIG. 1, reference character 10 generally designates a disc valve constructed in accordance with this invention and which basically comprises a tubular valve body 12 secured between a pair of tubular fittings 14 and 16, and having a disc element 18 supported in the central portion of the body 12. Each of the fittings 14 and 16 is adapted in any suitable manner for connection with adjacent portions of a conduit (not shown) in which the valve is interposed. For example, each of the fittings 14 and 16 may be provided with internal threads 20 which engage external threads on the adjacent ends of the conduit. It will be understood that the fittings 14 and 16 are secured on the adjacent portions of the conduit in such a manner that fluid flowing through the conduit will be directed through the valve body 12 and no leakage will occur between the conduit and the fittings 14 and 16.

Each of the fittings 14 and 16 is also provided with an upper pair of apertured bolt lugs 22 and a lower pair of apertured bolt lugs 24. Each set of upper bolt lugs 22 receives a bolt 26 and each set of lower bolt lugs 24 receives a suitable bolt 28. When the bolts 26 and 28 are tightened in a conventional manner, the inner ends 30 and 32 of the fittings 14 and 16, respectively, are pressed against the respective opposite ends 34 and 36 of the valve body 12 to rigidly support the valve body 12 in alignment with the fittings. It may also be noted here that the opposite ends 34 and 36 of the valve body 12 and the inner ends 30 and 32 of the fittings 14 and 16 are preferably machined to provide a close fit of the parts when the bolts 26 and 28 are tightened.

Figure 3:
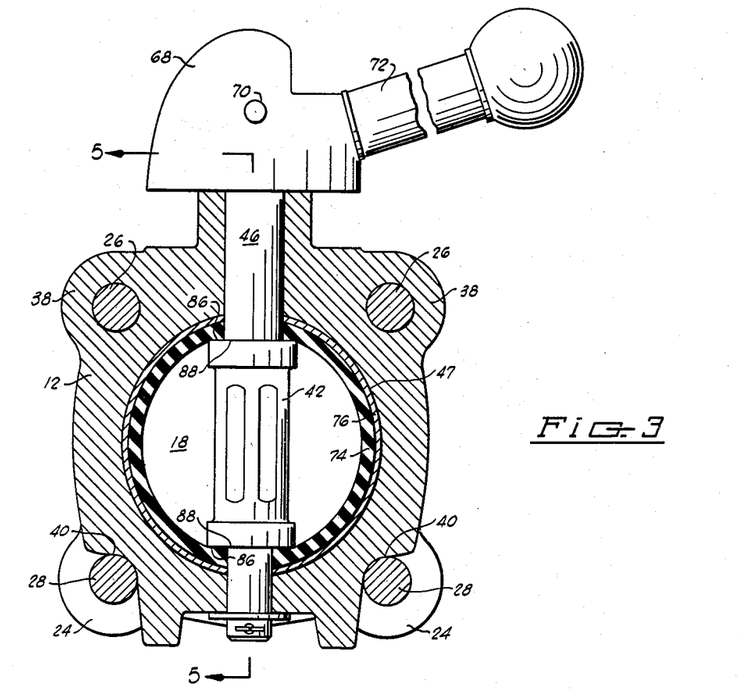
FIG. 3 is a vertical sectional view taken transversely through the central portion of a valve constructed in accordance with this invention and illustrating the valve disc in elevation, with the valve disc in a closed position.

As shown in FIG. 3, the body 12 is also provided with a pair of apertured bolt lugs 38 to receive the bolts 26 and assure alignment of the valve body 12 with the fittings 14 and 16 when the valve is assembled. Also, a pair of grooves 40 are provided on the lower portion of the valve body 12 to be contacted by the lower bolts 28 when the valve body 12 is in alignment with the fittings 14 and 16, such that the bolts 28 will support the valve body 12, yet the valve body 12 may be moved out from between the fittings 14 and 16 without the necessity of removing the bolts 28.

Figure 2:
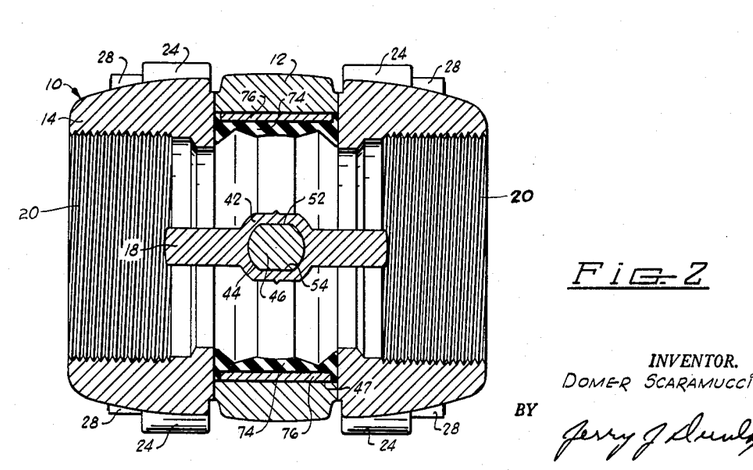
FIG. 2 is a sectional view of the valve, as would be taken along lines 2—2 of FIG. 1.
Figure 4:
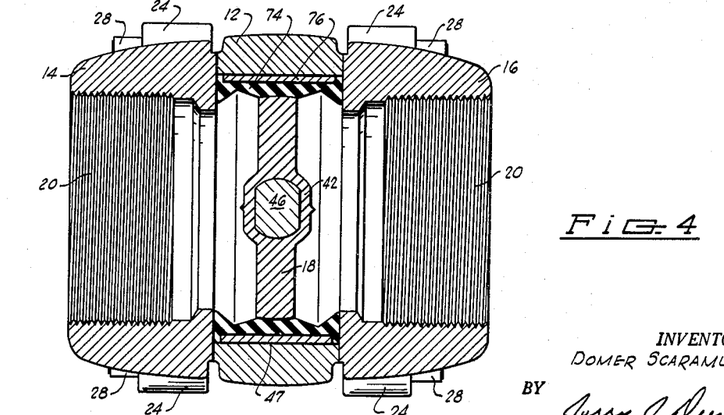
FIG. 4 is a sectional view similar to FIG. 2, but with the valve disc in a closed position.

The valve disc 18 is in the form of a substantially circular-shaped flat plate member having a hub 42 extending diametrically across the central portion thereof, as is most clearly shown in FIGS. 2 and 4. An opening 44 extends through the hub portion 42 of the disc 18 to loosely receive a shaft 46 which is journaled in the valve body 12 along an axis at right angles to the longitudinal axis of the axial bore 47 of the valve body, as will be described in more detail below. It should also be noted (see FIG. 1) that one end 48 of the disc opening 44 is reduced in diameter and the shaft 46 is also reduced in diameter at a point 50 in order to extend through the reduced diameter portion 48 of the opening.

Flat surfaces 52 (see also FIG. 2) are provided on opposite sides of the shaft 46 from the point 50 (where the shaft is reduced in diameter) into proximity with the opposite edge of the valve disc 18. The flat surfaces 52 extend parallel with the longitudinal axis of the shaft 46. Mating flat surfaces 54 are provided in the hub portion 42 of the disc 18, such that the disc 18 will be turned when the shaft 46 is turned for opening and closing the valve. It will also be noted that the flat surfaces 54 in the disc hub 42 extend parallel with the opposite faces of the disc 18, and since the opening 44 is slightly larger in diameter than the shaft 46, the disc 18 may move slightly on the shaft 46 in any direction which is parallel to the opposite faces of the disc. Therefore, any inadvertent lengthwise or sideways movement of the shaft 46 which is normally caused in the opening or closing of the valve will not effect the seating position of the valve disc 18, and the valve disc 18 will be self-centering in its seating movements, as will be described in more detail below.

The reduced diameter portion 56 (FIG. 1) of the shaft 46 extends through a mating bore 58 in the valve body 12 and may be provided with a cotter key 60 or the like outwardly of the valve body 12 to prevent lengthwise removal of the shaft. Also, a washer 62 may be provided around the reduced diameter portion 56 of the shaft between the cotter key 60 and the adjacent outer surface of the valve body 12, if desired. The opposite end portion 64 of the shaft 46 extends through a bore 66 in the valve body 12 positioned in diametrically opposed and aligned relation with respect to the bore 58. The bore 66 is of a size to suitably journal the shaft 46 in the valve body. A suitable hub 68 is secured on the end portion 64 of the shaft 46 by means of a pin 70 and is provided with a suitable handle 72, by which the valve disc 18 may be turned between its open and closed positions.

The valve disc 18 turns in and cooperates with an annular valve seat 74 formed of an elastic material and mounted on a metal liner 76. The metal liner 76 is tubular in form and has an outer diameter of a size to provide a sliding fit thereof in the axial bore 47 extending through the valve body 12. In this respect, it should also be noted that the diameter of the axial bore 47 is substantially larger than the inner diameters of the fittings 14 and 16, such that the seat 74 and liner 76 are positioned between the adjacent faces 30 and 32 of the fittings 14 and 16. Also, the length of the liner 76 is less than the length of the valve body 12, for purposes which will be described.

Figure 6:
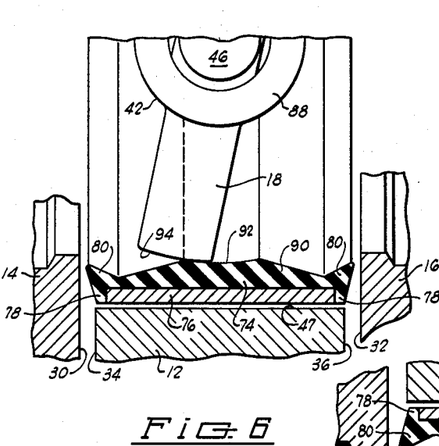
FIG. 6 is an enlarged and exploded detail of one side of the valve construction illustrating the function of the valve seat in its cooperation with the valve disc.
Figure 7:
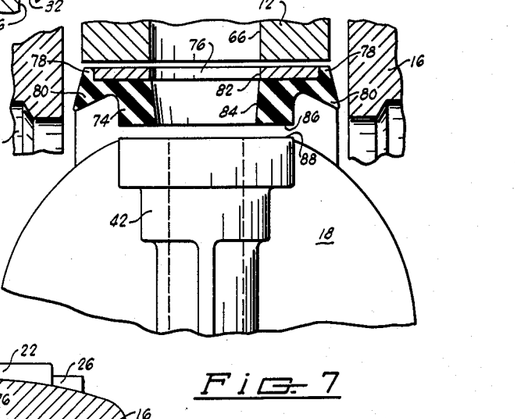
FIG. 7 is another enlarged and exploded detailed view illustrating the construction of the valve seat and disc where the supporting shaft extends through these members.

As shown most clearly in FIGS. 6 and 7, the valve seat 74 is provided with a circumferential lip 78 on each end thereof extending radially outward from the valve seat in overlapping relation over the respective end of the liner 76. Each circumferential lip 78 is of a thickness to be placed under compression against the respective end of the metal liner 76 and the adjacent face of the respective fitting 14 or 16 when the bolts 26 and 28 are tightened to assemble the valve in the manner previously described. Thus, the lips 78 form a seal between the liner 76 and the fittings 14 and 16 to prevent leakage between the fittings 14 and 16 and the opposite ends of the valve body 12, and particularly to prevent the leakage of fluid into the axial bore 47 of the valve body 12 when the valve is utilized in vacuum service.

In addition to the circumferential lips 78 at each end of the valve seat 74, the valve seat is also provided with a circumferential flange or lip portion 80 at each end thereof extending inwardly with respect to the seat. The flanges 80 are also of a size to be placed under compression when the fittings 14 and 16 are bolted against the opposite ends of the valve body 12, and it will be noted that each of the circumferential flanges 80 is tapered outwardly toward the respective fitting 14 or 16. Therefore, when the valve is utilized in a pressure service, the pressurized fluid tends to urge the flanges outwardly into tighter sealing engagement with the respective faces of the fittings 14 and 16 and prevent leakage of fluid from the valve.

Figure 5:
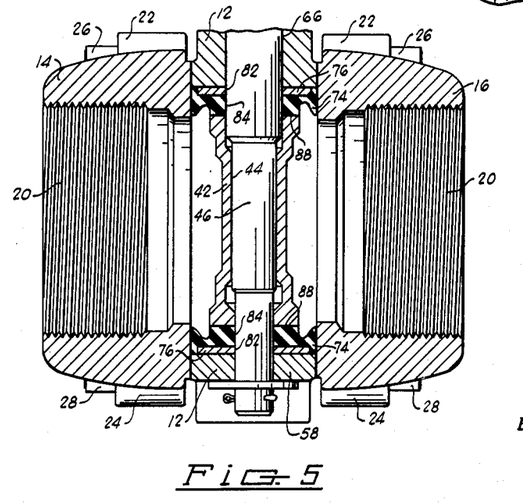
FIG. 5 is a sectional view as taken along lines 5—5 of FIG. 3.

As shown most clearly in FIGS. 5 and 7, the liner 76 and the valve seat 74 are provided with aligned openings 82 and 84 through which the shaft 46 extends when the valve is assembled. The apertures 82 in the liner 76 are sized to provide a loose fit of the liner around the respective portions of the shaft 46. However, the openings 84 in the valve seat 74 are sized to provide seals around the respective portions of the shaft 46, such that fluid from inside of the valve body 12 will not leak outwardly around the shaft 46 and through the bores 58 and 66 in the valve body. In other words, the diameter of each opening 84 is slightly less than the diameter of the adjacent portion of the shaft 46, such that the walls of the apertures 84 tend to grip the outer periphery of the respective portions of the shaft 46 in all operating positions of the shaft. It may also be observed in FIG. 7 that each aperture 84 may be tapered inwardly toward the valve disc 18, if desired, to enhance the seals provided by the seat 74 around the shaft 46.

The valve seat 74 is also provided with an inwardly extended flat bearing surface 86 on the inner periphery thereof around each of the apertures 84. The bearing surfaces 86 are annular in configuration and mate with cooperating bearing surfaces 88 formed on the opposite sides of the valve disc 18 at the opposite ends of the hub portion 42 to provide additional sealing around the shaft 46. It should also be noted that the distance between the bearing surfaces 86 of the valve seat 74 is less than the distance between the bearing surfaces 88 of the valve disc 18, such that the valve seat 74 is constantly maintained under compression along the diameter thereof which includes the bearing surfaces 86 and the mating bearing surfaces 86 and 88 are maintained under compressional contact in all operating positions of the valve disc 18. Although the constant compression of the valve seat 74 does provide a drag on the turning movement of the valve disc 18, such drag is not appreciable, and the compression of the valve seat adjacent the bearing surfaces 86 greatly enhances the seal provided by the seat around the shaft 46 to prevent leakage from the valve.

As shown most clearly in FIG. 6, the medial portion 90 of the valve seat 74 is sloped inwardly toward the center of the valve seat (between the bearing surfaces 86) and is provided with seating surfaces 92 curved in the form of opposed segments of a sphere. Each curved surface 92 of the valve seat is curved on the arc of a sphere having its center coincident with the center of the valve disc 18, and is positioned from the center of the valve disc 18 a distance slightly less than the radius of the valve disc. Also, the outer periphery 94 of the valve disc 18 (between the flat bearing areas 88) is rounded on the arc of a sphere having its center at the center of the disc to engage the curved surfaces 92 of the valve seat without damage to the valve seat. However, since the radius of each of the curved portions 92 of the valve seat 74 is less than the radius of the respective portions of the valve disc 18, the valve disc 18 will place the valve seat 74 under compression when either edge of the periphery of the valve disc is moved to a position opposite the curved surfaces 92. Therefore, the valve disc 18 will effectively prevent flow of fluids through the valve even though the valve disc is not precisely in a plane transverse to the axis of the axial bore 47, whereby precise indexing of the valve disc 18 into a closed position is not required. It may also be observed in FIG. 6 that the width of each curved portion 92 of the valve seat 74 preferably corresponds to the thickness of the valve disc 18 to provide an efficient seating of the valve disc in the valve seat 74 when the valve disc is extended transversely across the axial bore 47.

As previously indicated the valve seat 74 is formed of an elastic material, such as a natural or synthetic rubber. It will be understood that the valve seat 74 will be formed of a material which will resist the action of whatever fluid the valve 10 is intended to control. For example, in the petroleum industry, the valve seat 74 will normally be formed of an oil-resistant and acid-resistant material, such as neoprene, which is a synthetic rubber. In the preferred construction, the valve seat 74 is bonded to the liner 76 to enhance the seal between the seat and the liner and facilitate the removal of the seat and liner as a unit when the valve is repaired. However, the outer diameter of the seat 74 may be of a size to provide a compressional fit of the seat in the liner 76, if desired.

*Operation*

The valve 10 operates in a normal manner in providing the maximum flow through the valve when the valve disc 18 is turned into a plane coincident with the longitudinal axis of the axial bore 47, as illustrated in FIG. 2, and to prevent flow of fluid through the valve when the valve disc is turned into a plane extending at right angles to the axial bore 47, as illustrated in FIGS. 3 and 4. However, certain operational features of the valve 10 make it highly effective in many industries.

The relatively loose fit of the valve disc 18 on the shaft 46 prevents sideways movement of the valve disc away from the center of the seat 74 when the shaft 46 is inadvertently moved lengthwise or sideways while the valve is being opened or closed. Also, this loose fit provides a self-centering action of the valve disc 18 when the valve is being closed. In other words, if the valve disc 18 is slightly off center when the handle 72 is turned to move the valve to a closed position, the valve disc 18 may move a short distance sideways on the shaft 46 in the direction of the flat surfaces 52 and 54, upon contact with the valve seat 74, to provide an automatic centering of the valve disc 18 in the valve seat 74.

It has been noted that the valve disc 18 will effectively close the valve by cooperation with the curved surfaces 92 of the valve seat, even though the valve disc is not precisely aligned with a plane transverse to the axial bore 47, to allow what is commonly known as undertravel or overtravel and yet provide an effective closing of the valve. It has also been noted that the valve seat 74 provides an effective seal around the shaft 46 at the opposite sides of the valve disc 18 to prevent leakage of fluid around the shaft 46 and through the bores in the valve body utilized to support the shaft. Thus, no secondary seals are required in the valve body 12 to prevent leakage around the shaft 46.

One of the important features of the present invention is the ease of repair of the valve, such that the valve may be repaired in the field by unskilled workmen, and without the use of special tools. To remove the valve body 12, valve disc 18 and valve seat 74, it is simply necessary to remove the bolts 26 and then pull on the handle 72 in a direction away from the bolts 28. It will be understood that the bolts 28 are also loosened to reduce the contact between the fittings 14 and 16 and the valve body 12 in the vicinity of the bolts 28. After the valve body 12 is removed from between the fittings 14 and 16, the cotter pin 60 is removed and the shaft 46 may be removed lengthwise from the valve body and the valve disc 18 by pulling outwardly on the handle 72. The valve disc 18 may then be forced out of the seat 74 by hand pressure and the valve seat 74 and liner 76 are removed as a unit from the valve body 12 by pushing endwise on these members.

In a normal wear situation, the valve seat 74 will become worn first. In this event, it is simply necessary to insert a new valve seat and liner unit in the valve body and then the various parts of the valve are reassembled in a direction inverse to that just described. It may be noted, however, that the shaft 46 may be easily inserted in and through the valve disc 18 when the flat surfaces 52 and 54 are aligned and no appreciable force is required. It should also be noted that when the assembled valve body 12 is again inserted between the fittings 14 and 16, the grooves 40 will seat on the bolts 28 and, in this position of the valve body, the apertured lugs 28 of the valve body are aligned with the apertured lugs 22 of the fittings 14 and 16 for an easy insertion of the bolts 26 into their assembled positions.

Figure 8:
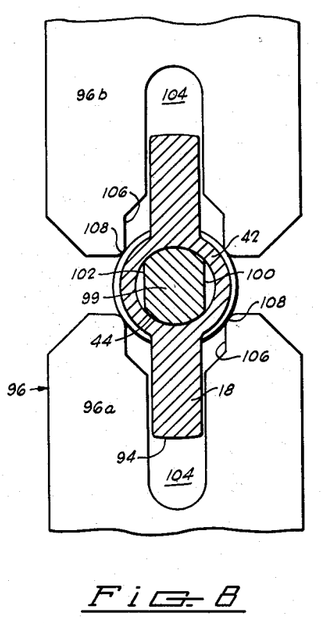
FIG. 8 is a schematic drawing illustrating the preferred method of forming the valve disc and illustrating the positions of the dies used in forming the disc at the beginning of the forming operation.
Figure 9:
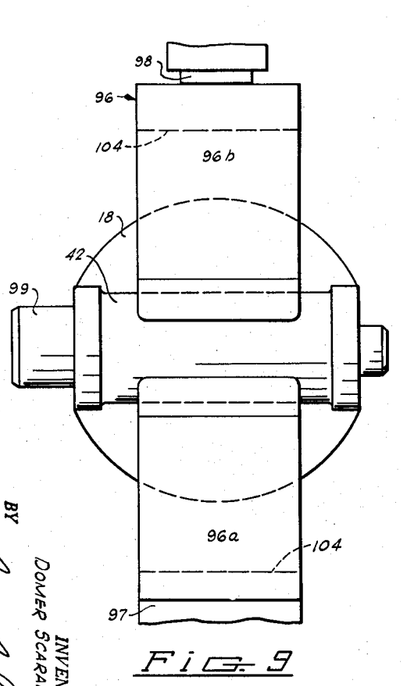
FIG. 9 is a side view of the structure shown in FIG. 8.
Figure 10:
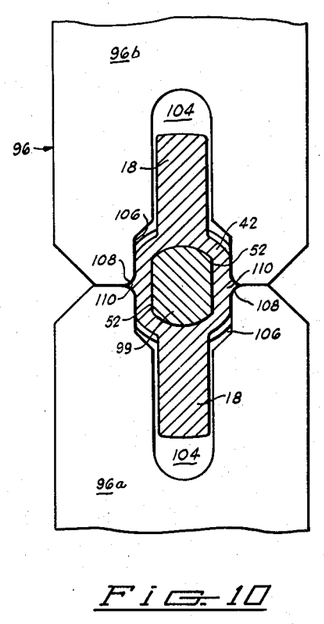
FIG. 10 is a view similar to FIG. 8 illustrating the positions of the dies at the conclusion of the forming operation.

As previously indicated, the present invention also contemplates a novel method of forming a valve disc. This method is illustrated in FIGS. 8, 9 and 10. The disc 18 will normally be cast or forged into substantially the desired configuration, with the hub portion 42 extending along a diameter of the disc. Then the outer periphery 94 of the disc and the bearing areas 88 will be machined and the opening 44 will be bored through the hub portion 42 precisely along a diameter of the disc. The machining of the outer periphery 94, the bearing areas 88 and the opening 44 are conventional machine shop operations and need not be described in detail herein. It need only be noted that the opening 44 should be formed circular in cross-section, and that a uniform amount of metal should be left in the hub portion 42 around the opening 44.

In accordance with this invention, the machined disc 18 is placed in a segmented forming shoe or die 96 having its lower portion 96a secured on the table 97 of a suitable hydraulic press, and having its upper portion 96b secured to the ram 98 of the press, as is common in the art. A forming mandrel 99 is then inserted in the opening 44. The mandrel 99 has substantially the same dimensions as the portion of the shaft 46 to be utilized in the valve disc 18 and is provided with flat surfaces 100 and 102 on the opposite sides thereof corresponding in size and positions with the flat surfaces 42 of the shaft 46, previously described. The stationary portion 96a of the forming die 96 is provided with a semi-circular shaped slot 104 of a size to loosely receive one edge of the valve disc 18. However, the outer edge portion 106 of the slot 104 has a width equal to the thickness of the mandrel 99 between the flat portions 100 and 102, plus twice the wall thickness of the hub portion 42, for purposes which will be described. It will be understood that the width of the die 96 (measured along the length of the hub portion 42) is equal to the length of the flat areas 100 and 102 of the mandrel 99, as clearly shown in FIG. 9. Thus, the forming die 96 will contact only that portion of the hub 42 opposite the flat areas 100 and 102. It will also be noted that the outer edges 103 of the slot 104 are rounded.

The movable portion 96b of the die 96, conforming in all respects to the construction of the previously described portion 96a, is positioned over the other side of the disc 18 and moved over the disc 18 by the ram 98 until the rounded shoulders 108 thereof contact the hub 42 of the disc. The movable die portion 96b is then forced toward the stationary die portion 96a until the die portions are brought into contact as illustrated in FIG. 10. As the die portions are brought together, it will be apparent that the portions of the hub 42 opposite the flat areas 100 and 102 of the mandrel 99 are forced inwardly into contact with these flat areas. However, since the shoulders 108 of the die are rounded, and since the width of each portion 106 of each slot 104 is equal to twice the wall thickness of the hub 42 plus the thickness of the mandrel 99 between the flat areas 100 and 102, no portion of the hub 42 will be stretched beyond its elastic limit. On the contrary, the cold working of the hub 42 by action of the die 96 along planes parallel to the flat areas 100 and 102 actually increases the strength of the hub portion 42. It may also be noted in FIG. 10 that the rounded shoulders 108 of the die 96 accommodate the excess metal in the hub portion 42 which is provided as the hub is cold worked inwardly toward the flat areas 100 and 102. The excess metal provides ribs 110 extending along the opposite sides of the hub 42 in alignment with the resulting flat areas 52 of the disc 18. These ribs 110 may be either ground off or left on the valve disc 18 without affecting the flow characteristics of the valve in which the disc is used, since they are rounded and are not of appreciable size.

After the valve disc 18 is formed in the manner described, the die portion 96b is moved away from the stationary portion 96a and the disc is easily removed from the stationary die portion. The material forming the hub 42 will expand or relax slightly when the die 96 is removed, such that the mandrel 99 may be easily removed lengthwise from the opening 44. The valve disc is then ready for assembly in a disc valve in the manner previously described.

The pressure responsive seals at the opposite ends of the valve seat 74, which are provided by the inwardly extending circumferential flanges or lips 80 as illustrated in the embodiment of FIGS. 1 through 7, were preformed, that is, the inwardly extending circumferential flanges 80 are formed during the molding of the seat. However, pressure responsive seals may be provided by deformation of the opposite ends of the seat during the assembly of the valve as illustrated in FIGS. 11 through 14.

Figure 11:
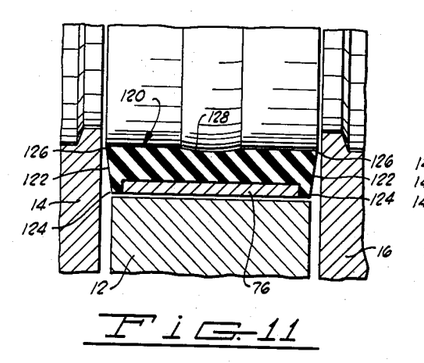
FIG. 11 is an exploded detailed sectional view, similar to FIG. 6, illustrating a modified seat construction.

In FIG. 11, I have shown a modified valve seat 120 formed of a suitable elastic material and bonded around the inner periphery of a liner 76 for ease in repairing the valve as previously described in connection with FIGS. 1 through 7. Each end face 122 of the modified seat 120 is tapered outwardly with respect to the valve body 12 from the outer periphery 124 of the seat to the inner periphery 126 thereof. Thus, the length of the valve seat 120 is greater at its inner periphery 126 than at its outer periphery 124. It will also be noted that the seat 120 is illustrated in its relaxed condition in FIG. 11 and that the ends of the seat extend over the opposite ends of the liner 76 and extend beyond the opposite ends of the valve body 16. The length of the seat 120 at its outer periphery 124 is at least as great as the length of the valve body 12. It may also be noted in FIG. 11 that the inner diameter of the seat 120, in the relaxed condition of the seat, is uniform from each end face 122 to the central portion 128 of the seat. The central portion 128 is spherically shaped to facilitate closing of the valve disc (not shown in FIG. 11) in the manner previously described.

Figure 12:
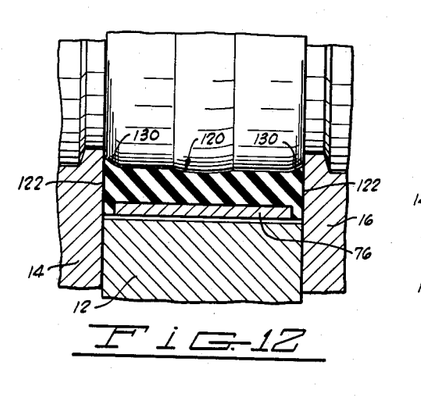
FIG. 12 is a view of the modified seat of FIG. 11 showing deformation of the seat by the tubular fittings.

As the tubular fittings 14 and 16 are moved against the opposite ends of the valve body 12 during assembly of the valve, the tubular fittings contact the opposite end faces 122 of the seat 120 and deform the end portions of the seat at the inner periphery of the seat to provide inwardly extending circumferential flanges or lips 130 as shown in FIG. 12. The flanges 130 are tapered outwardly from the respective tubular fittings 14 and 16, with respect to the center line of the seat, to present areas responsive to the pressure inside of the seat 120, whereby any increase in pressure inside of the seat 120 tends to force the flanges 130 tighter against the tubular fittings 14 and 16 and enhance the seal between the interior of the seat and the tubular fittings.

Figure 13:
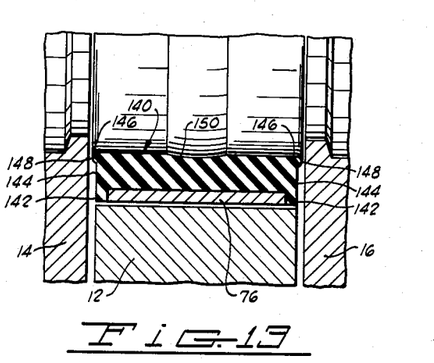
FIG. 13 is another exploded detailed sectional view similar to FIG. 6, illustrating a further modified seat construction.

Another modified valve seat 140 is shown in its relaxed condition in FIG. 13. The seat 140 is formed of a suitable elastic material and is bonded around the inner periphery of a liner 76 for ease in replacement within the valve body 12. The seat 140 extends over the opposite ends of the liner 76 and the length of the seat at its outer periphery 142 is at least as long as the valve body 12. Each end face 144 of the seat 140 is substantially flat from the outer periphery 142 into proximity with the inner periphery 146 where an outwardly projecting bead 148 is formed. It will also be noted that the inner periphery of the seat 140 is uniform from the bead 148 to the central portion 150 of the seat.

Figure 14:
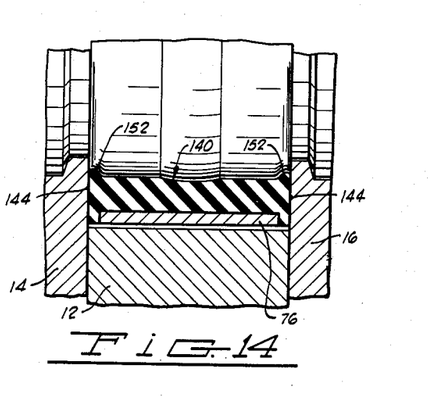
FIG. 14 is a view of the modified seat of FIG. 13 showing deformation of the seat by the tubular fittings.

When the tubular fittings 14 and 16 are moved against the opposite ends 144 of the modified seat 140, as shown in FIG. 14, the opposite ends of the seat are deformed to provide inwardly extending circumferential flanges or lips 152 at each end of the seat. Since the beads 148 project outwardly from the opposite ends of the body 12, and the remaining portion of each end face 144 of the valve seat extends outwardly at least as far as the respective end of the valve body 12, that portion of the seat material formed into the beads 148 is deformed inwardly by the tubular fittings 14 and 16 as these fittings are brought against the opposite ends of the valve body 12. The resulting circumferential flanges 152 are tapered inwardly from the respective tubular fittings 14 and 16, with respect to the center line of the seat, to provide areas responsive to the internal pressure in the seat 140 and thus provide pressure responsive seals in the manner previously described.

From the foregoing, it will be apparent that the present invention provides a novel disc-type valve which may be easily and quickly repaired in the field without the use of special tools. The novel valve seat construction of this invention provides an effective seal at the opposite ends of the valve body against the leakage of fluids when the valve is used in either a pressure service or a vacuum service, and the valve seat may be easily replaced in a valve assembly. It will also be apparent that the present invention provides a novel attachment construction for mounting a valve disc on its supporting shaft, such that the valve disc will be self-centering and will not be affected by inadvertent endwise or sideways movements of the supporting shaft during opening or closing of the valve. The valve disc and seat are also constructed to provide an effective closing of the valve without a precise indexing of the valve, and the valve seat provides an effective seal around the supporting shaft of the valve disc to prevent leakage from the valve body, without the necessity of secondary seals around the shaft. It will further be apparent that the present invention provides a novel method of forming a disc for a disc-type valve which requires a minimum of machine work and a minimum of time for the forming operation. On smaller types of valves, I have found that the flat areas on the valve disc may be formed in one minute, which provides an economical and practical forming operation. Finally, it will be apparent that the present disc valve is simple in construction, may be economically manufactured and will have a long service life.

Changes may be made in the combination and arrangement of parts or elements, as well as in steps and procedures, as heretofore set forth in the specification and shown in the drawings, it being understood that changes may be made in the embodiments disclosed without departing from the spirit and scope of the invention as defined in the following claims. For example, although I have described one of the die portions being held in a stationary position for the forming operation, it will be apparent that both of the die portions may be moved toward one another and then away from one another, and an effective forming operation is obtained.

I claim:

1. A disc valve for controlling the flow of fluid through a conduit, comprising a pair of tubular fittings adapted for connection with adjacent portions of the conduit, a body element having an axial bore therethrough, means for securing the body element between said fittings to direct fluid from the conduit through said axial bore, a shaft journaled in the body at right angles to said axial bore in a position to extend transversely through the center of said axial bore, means for turning the shaft, a substantially circular-shaped and flat disc element in said axial bore having an opening extending diametrically therethrough to receive said shaft, said shaft and said opening through said disc element having at least one pair of cooperating flat surfaces extending parallel with the opposite faces of the disc element to provide turning of the disc element upon turning of the shaft, said opening through said disc element being of a size to loosely receive said shaft for limited independent movement of said shaft and disc element in any direction parallel with the opposite faces of the disc element while said cooperating flat surfaces are in contact, and an annular seat formed of elastic material and carried by one of said elements to provide a seal between the outer periphery of said disc element and the walls of said axial bore when the disc element is turned into a plane extending transversely across said axial bore, while allowing limited movement of said disc element parallel with said cooperating flat surfaces, whereby said disc element is self-centering when turned into a plane extending transversely across said axial bore.

2. A disc valve as defined in claim 1 wherein said shaft has diametrically opposed flat surfaces extending parallel with the axis of the shaft on that portion of the shaft extending through said axial bore, and said opening through said disc element having diametrically opposed flat surfaces therein extending parallel with the opposite faces of the disc element and arranged to engage the flat surfaces on the shaft for turning of the disc element upon turning of the shaft.

3. A disc valve as defined in claim 2 wherein the diameters of the shaft and said opening through the disc element are reduced adjacent one end of said opening, and said flat surfaces are provided on the larger diameter portion of the shaft and in the larger diameter portion of said opening to facilitate the assembly of the disc element on the shaft.

4. A disc valve as defined in claim 1 wherein said annular seat is secured in sealing relation to the walls of said axial bore and has aligned openings therethrough of a size to receive said shaft and provide a seal around said shaft at each end of the opening through the disc element to prevent leakage through the body around the shaft.

5. A disc valve as defined in claim 4 wherein said disc element has diametrically opposed flat bearing areas on the outer periphery thereof around each end of said opening, said seat has mating flat bearing areas on the inner periphery thereof around the respective openings receiving the shaft, and said seat is of a size to retain compression between said mating bearing areas in all operative positions of the disc element.

6. A disc valve as defined in claim 5 wherein the outer periphery of said disc element is rounded between said flat bearing areas, and the inner periphery of the medial portion of said seat, between said flat bearing areas, is curved in the form of opposed segments of a sphere having its center in the center of the seat, and said seat is of a size to provide engagement between the seat and disc element whenever any portion of the rounded periphery of the disc element is opposite said curved portions of the seat.

7. A disc valve for use in controlling the flow of fluid through a conduit, comprising: a pair of tubular fittings adapted for connection with adjacent portions of the conduit; a body having a smooth-walled axial bore therethrough larger in diameter than the inner diameter of the fittings; means for securing the body between said fittings to direct fluid through said axial bore; a tubular re-enforcing liner axially slideable in said axial bore; an annular seat of resilient material bonded around the inner periphery of the liner and having a length, in its relaxed condition, greater than the length of said axial bore for compression of the seat between the tubular fittings and providing a seal between the opposite ends of the seat and the tubular fittings, said seat having circumferential flanges on the opposite ends thereof extending radially inwardly with respect to the body to further enhance the seal between the seat and the fittings; a valve disc of a size to engage the seat around the periphery of the seat and prevent flow of fluid through the seat; means for rotatably supporting the disc in the seat for movement around an axis at right angles to said axial bore; and means for turning the disc between its open and closed positions.

8. A disc valve for use in controlling the flow of fluid through a conduit, comprising: a pair of tubular fittings adapted for connection with adjacent portions of the conduit; a body having a smooth-walled axial bore therethrough larger in diameter than the inner diameters of the fittings; means for securing the body between said fittings to direct fluid from the conduit through said axial bore; a tubular re-enforcing liner axially slideable in said axial bore; and annular seat of resilient material bonded around the inner periphery of the liner and having a length, in its relaxed condition, greater than the length of said axial bore for compression of the seat between the tubular fittings and providing a seal between the opposite ends of the seat and the tubular fittings, said seat having inwardly extending circumferential flanges on the opposite ends thereof, the sides of said flanges facing the interior of the seat being tapered for pressing of the flanges against the fittings in response to pressure of fluid in the seat; a valve disc of a size to engage the seat around the periphery of the seat and prevent flow of fluid through the seat; means for rotatably supporting the disc in the seat for movement around an axis at right angles to said axial bore; and means for turning the disc between its open and closed positions.

9. A disc valve for use in controlling the flow of fluid through a conduit, comprising: a pair of tubular fittings adapted for connection with adjacent portions of the conduits; a body having a smooth-walled axial bore therethrough larger in diameter than the inner diameters of the fittings; means for securing the body between said fittings to direct fluid from the conduit through said axial bore; a tubular re-enforcing liner slidingly fitting in said axial bore and having a length less than the length of said axial bore; an annular seat of resilient material secured around the inner periphery of the liner and having a length, in its relaxed condition, greater than the length of said axial bore for compression of the seat between the tubular fittings and providing a seal between the opposite ends of the seat and the tubular fittings, said seat having inwardly and outwardly extending circumferential flanges on the opposite ends thereof, said outwardly extending flanges overlapping the ends of the liner, and said inwardly extending flanges being tapered for movement against the fittings in response to pressure of fluid in the seat; a valve disc of a size to engage the seat around the periphery of the seat and prevent flow of fluid through the seat; means for rotatably supporting the disc in the seat for movement around an axis at right angles to said axial bore; and means for turning the discs between its open and closed positions.

10. A disc valve for use in controlling the flow of fluid through a conduit, comprising: a pair of tubular fittings adapted for connection with adjacent portions of the conduit; a body having an axial bore therethrough; means for securing the body between the tubular fittings to direct fluid from the conduit through said axial bore; a tubular re-enforcing liner slidingly fitting in said axial bore; a seat of elastic material bonded around the inner periphery of the liner, and having a length, in its relaxed condition, greater than the length of said axial bore for compression of the seat between the tubular fittings and providing a seal between the opposite ends of the seat and the tubular fittings; a valve disc of a size to engage the seat around the periphery of the seat; aligned openings in the body, liner, seat and disc extending along an axis at right angles to the axis of said bore; a shaft extending through said openings and secured to the disc for turning the disc between open and closed positions; said disc having diametrically opposed flat bearing areas on the outer periphery thereof around the shaft opening; and said seat having diametrically opposed flat annular-shaped bearing areas on the inner periphery thereof around the shaft opening mating with the disc bearing areas, the seat bearing areas being projected into the seat for exposure of opposite sides thereof to the pressure of the fluid and the distance between the seat bearing areas, in the relaxed condition of the seat, being less than the distance between the disc bearing areas for compression of the seat bearing areas around the shaft when the disc is positioned in the seat, whereby the portions of the seat around the shaft provide both low and high pressure seals against the leakage of fluid through the seat, liner and body openings.

11. A disc valve as defined in claim 10 wherein each opening through the seat is tapered inwardly toward the center of the seat and the smaller diameter portion thereof is less in diameter than the diameter of the mating portion of the shaft to enhance the seal of the seat around the shaft.

12. A disc valve for use in controlling the flow of fluid through a conduit, comprising: a pair of tubular fittings adapted for connection with adjacent portions of the conduit; a body having an axial bore therethrough; means for securing the body between the tubular fittings to direct fluid from the conduit through said axial bore; a tubular re-enforcing liner slidingly fitting in said axial bore; a seat of elastic material secured around the inner periphery of the liner, and having a length, in its relaxed condition, greater than the length of said axial bore for compression of the seat between the tubular fittings and providing a seal between the opposite ends of the seat and the tubular fittings; a valve disc of a size to engage the seat around the periphery of the seat; aligned openings in the body, liner, seat and disc extending along an axis at right angles to the axis of said bore; a shaft extending through said openings and secured to the disc for turning the disc between open and closed positions; the outer edge of the disc being rounded; and the central portion of the seat, between the shaft openings, being curved outwardly in the form of opposed segments of a sphere having its center in the center of the seat into which the disc is pressed when the disc is in a closed position at right angles to the axis of said axial bore.

13. A disc valve as defined in claim 12 wherein the seat is tapered inwardly from adjacent the opposite ends thereof to the opposite sides of said curved portions, and said curved portions are positioned to provide interference between the disc and the seat when the disc is positioned only approximately at right angles to the axis of said axial bore to minimize the precision required in positioning the disc in a closed position.

14. A disc valve for use in controlling the flow of fluid through a conduit, comprising: a pair of tubular fittings adapted for connection with adjacent portions of the conduit; a body having an axial bore therethrough; means for securing the body between the tubular fittings to direct fluid from the conduit through said axial bore; a tubular re-enforcing liner axially slideable in said axial bore; a seat of elastic material bonded around the inner periphery of the liner and having a length, in its relaxed condition, greater than the length of said axial bore and having its ends shaped for compression of the seat between the tubular fittings to form inwardly extending pressure responsive seals between the opposite ends of the seat and the tubular fittings; a valve disc of a size to engage the seat around the inner periphery of the seat; aligned openings in the body, liner, seat and disc extending along an axis at right angles to the axis of said bore; and a shaft extending through said openings and secured to the disc for turning the disc between open and closed positions.

15. A disc valve as defined in claim 14 wherein the seat of elastic material, in its relaxed condition, is longer at its inner periphery than at its outer periphery for deformation of the opposite end portions of the seat by the tubular fittings into inwardly extending pressure responsive seals.

16. A disc valve as defined in claim 15 wherein each end face of of the seat of elastic material in its relaxed condition, is tapered outwardly with respect to the valve body from the outer periphery thereof toward the inner periphery thereof.

17. A disc valve as defined in claim 15 wherein each end face of the seat of elastic material, in its relaxed condition, is shaped to provide an outwardly projecting bead adjacent the inner periphery of the seat.

References Cited in the file of this patent

UNITED STATES PATENTS

| | | |
|---|---|---|
| 1,977,351 | Phillips | Oct. 16, 1934 |
| 2,740,423 | Stillwagon | Apr. 3, 1956 |
| 2,853,267 | Herren | Sept. 23, 1958 |
| 2,923,524 | Fawkes | Feb. 2, 1960 |
| 2,994,342 | Stillwagon | Aug. 1, 1961 |